US012255400B2

(12) United States Patent
Cai

(10) Patent No.: US 12,255,400 B2
(45) Date of Patent: Mar. 18, 2025

(54) ARRAY ANTENNA APPARATUS AND PREPARATION METHOD THEREFOR, AND ELECTRONIC DEVICE

(71) Applicant: STURMVÖGEL INNOVATION GUANGZHOU CO. LTD., Guangzhou (CN)

(72) Inventor: Bo Cai, Guangzhou (CN)

(73) Assignee: STURMVÖGEL INNOVATION GUANGZHOU CO. LTD., Guangzhou (CN)

( * ) Notice: Subject to any disclaimer, the term of this patent is extended or adjusted under 35 U.S.C. 154(b) by 192 days.

(21) Appl. No.: 17/901,856

(22) Filed: Sep. 2, 2022

(65) Prior Publication Data

US 2022/0416443 A1 Dec. 29, 2022

Related U.S. Application Data

(63) Continuation of application No. PCT/CN2021/073822, filed on Jan. 26, 2021.

(30) Foreign Application Priority Data

Jan. 31, 2020 (CN) ......................... 202010077702.5

(51) Int. Cl.
*H01Q 9/04* (2006.01)
*H01Q 1/22* (2006.01)
(Continued)

(52) U.S. Cl.
CPC ............. *H01Q 21/065* (2013.01); *H01Q 1/22* (2013.01); *H01Q 9/0414* (2013.01); *H01Q 19/10* (2013.01); *H01Q 21/0087* (2013.01)

(58) Field of Classification Search
CPC .... H01Q 21/065; H01Q 21/0087; H01Q 1/22; H01Q 1/50; H01Q 1/38; H01Q 9/0414
See application file for complete search history.

(56) References Cited

U.S. PATENT DOCUMENTS 11,637,362 B2 * 4/2023 Kim ..................... H01Q 1/2283 343/893
2003/0137456 A1 * 7/2003 Sreenivas ................ H01Q 5/42 343/700 MS (Continued)

FOREIGN PATENT DOCUMENTS

CN 1658433 A 8/2005
CN 103646144 A 3/2014

(Continued)

OTHER PUBLICATIONS

International Search Report of PCT Patent Application No. PCT/CN2021/073822 issued on Mar. 30, 2021.

*Primary Examiner* — Awat M Salih

(57) ABSTRACT

The present invention relates to the technical field of communications, and in particular relates to an array antenna apparatus and a preparation method therefor, and an electronic device. The array antenna apparatus includes a first substrate and a second substrate which are provided from top to bottom. A first antenna is provided on the first substrate, a second antenna is provided on the second substrate, the first antenna is provided with a plurality of array elements arranged in an array, the second antenna is provided with a plurality of array elements arranged in an array, and the projections, on the second substrate, of all the array elements of the first antenna and all the array elements of the second antenna do not completely coincide. The present invention has the advantages of low sidelobe, large bandwidth, and multiple beams, etc.

13 Claims, 5 Drawing Sheets

(51) Int. Cl.

| | |
|---|---|
| ***H01Q 19/10*** | (2006.01) |
| ***H01Q 21/00*** | (2006.01) |
| ***H01Q 21/06*** | (2006.01) |

(56) References Cited

U.S. PATENT DOCUMENTS

| | | | | |
|---|---|---|---|---|
| 2010/0171675 | A1* | 7/2010 | Borja | H01Q 21/24 343/797 |
| 2015/0236425 | A1* | 8/2015 | Sudo | H01Q 9/42 343/700 MS |
| 2018/0090852 | A1* | 3/2018 | Dufilie | H01Q 1/38 |

FOREIGN PATENT DOCUMENTS

| | | | |
|---|---|---|---|
| CN | 104769775 | A | 7/2015 |
| CN | 109962334 | A | 7/2019 |
| CN | 210957007 | U | 7/2020 |

* cited by examiner

ARRAY ANTENNA APPARATUS AND PREPARATION METHOD THEREFOR, AND ELECTRONIC DEVICE

BACKGROUND OF THE PRESENT INVENTION

Field of Invention

The present invention relates to the technical field of communication, in particular to an array antenna apparatus and a preparation method therefor, and an electronic device using the array antenna apparatus for communication.

Description of Related Arts

With the development of modern wireless communication technology, antennas play a very important role in mobile communication devices. With the advent of the fifth-generation mobile communication technology era (5G era), in order to meet the high-rate information transmission requirements of the 5G era, therefore, it is necessary to form an array antenna with multiple antenna elements to increase its gain, and to achieve an increase in information transmission capacity through multiple antennas. However, in the prior art, as an array antenna applied to terminal equipment and base stations, a single and fixed antenna array structure is usually adopted, and there will be sidelobe levels during operation, which will cause the signal-to-noise ratio of the signal to decrease. The single and fixed antenna array structure makes the antenna working frequency bandwidth limited and the beam direction is single, which limits the working accuracy, working band and working range of the antenna. Therefore, in the development of antennas, the development of an antenna with the advantages of low sidelobes, large bandwidth and multiple beams is particularly important in the technical field of communication, and it is also particularly necessary to meet the communication needs of the 5G era.

SUMMARY OF THE PRESENT INVENTION

The embodiment of the present invention provides an array antenna apparatus and a preparation method therefor, and an electronic device, which overcomes the technical problems of fixed beam, narrow beam width, and limited bandwidth in the traditional planar antenna array method while ensuring resolution, it also has the advantages of low sidelobes, large bandwidth, and multiple beams.

In one aspect, in order to achieve the above advantages, the present invention provides an array antenna apparatus, including:

at least two substrates: a first substrate and a second substrate which are provided from top to bottom, wherein a first antenna is provided on the first substrate; a second antenna is provided on the second substrate;

the first antenna is provided with a plurality of array elements arranged in an array, the second antenna is provided with a plurality of array elements arranged in an array;

and the projections of all the array elements of the first antenna and all the array elements of the second antenna on the second substrate do not completely coincide.

Preferably, all the array elements of the first antenna are symmetrically distributed about a geometric center of the first substrate, and all the array elements of the second antenna are symmetrically distributed about a geometric center of the second substrate, projections of the geometric center of the first substrate and the geometric center of the second substrate on the second substrate coincide;

Preferably, the size of each array element of the first antenna is different from the size of each array element of the second antenna.

Preferably, all the array elements of the first antenna are not symmetrically distributed about the geometric center of the first substrate, all the array elements of the second antenna are not symmetrically distributed about the geometric center of the second substrate, the projections of the geometric center of the first substrate and the geometric center of the second substrate on the second substrate coincide.

Preferably, spacings between any two adjacent array elements, in a second direction perpendicular to a first direction which is from top to bottom, of the array elements of each row of the first antenna are unequal, and spacings between any two adjacent array elements in the second direction of the array elements of each row of the second antenna are unequal.

Preferably, the sizes of all the array elements of the first antenna are the same, the sizes of all the array elements of the second antenna are the same, and the sizes of the array elements of the first antenna are different from the sizes of the array elements of the second antenna.

Preferably, the spacing between two adjacent array elements in the transverse and/or longitudinal direction of the first substrate among all the array elements of the first antenna gradually increases as a distance from the geometric center of the first substrate increases, the spacing between two adjacent array elements in the transverse and/or longitudinal direction of the second substrate among all the array elements of the second antenna gradually decreases as the distance from the geometric center of the first substrate decreases.

Preferably, the spacing between two adjacent array elements in the transverse and/or longitudinal direction of the first substrate among all the array elements of the first antenna gradually decreases as the distance from the geometric center of the first substrate increases, the spacing between two adjacent array elements in the transverse and longitudinal direction of the second substrate among all the array elements of the second antenna gradually increases or decreases as the distance from the geometric center of the first substrate increases.

Preferably, the width of each array element of the first antenna gradually increases or decreases as the distance from the geometric center of the first substrate increases, the width of each element of the second antenna gradually increases or decreases as the distance from the geometric center of the second substrate increases, and the length of each element of the first antenna is a first preset value, and the length of each element of the second antenna is a second preset value different from the first preset value.

Preferably, the distance between the geometric centers of any two adjacent array elements of the first antenna is a first specified value; the distance between the geometric centers of any two adjacent array elements of the second antenna is a second specified value different from the first specified value.

In another aspect, the embodiment of the present invention further provides a preparation method of array antenna, comprising:

forming a first antenna on a first substrate, and the first antenna is provided with a plurality of array elements arranged in an array;

forming a second antenna on the second substrate, and the second antenna is provided with a plurality of array elements arranged in an array; and, placing the first substrate above the second substrate, wherein, the projections of all the array elements of the first antenna and all the array elements of the second antenna on the second substrate do not completely coincide.

In another aspect, the embodiments of the present invention further provide an electronic device, which includes the array antenna apparatus described in any one of the preceding aspects.

Preferably, the electronic device is at least one of a mobile communication device, a radar device, a satellite communication device, or an automobile.

Beneficial Effect

The array antenna apparatus, the preparation method therefore, and the electronic device of the present invention have the following beneficial effects:

1) sidelobe suppression: reducing the energy distribution of the upper sidelobe to reduce the co-frequency, adjacent frequency, cross-area interference caused by the excessive upper sidelobe, achieving the optimized zero-point cancellation effect, so as to achieve a more ideal sidelobe suppression;
2) large bandwidth or multiple channels: with high information rate, wide spectrum spreading ability, reducing multipath, clutter and enhancing anti-interference ability; in the wireless communication of adjacent frequencies, it is easy to overcome mutual interference; greatly increasing the communication volume:
3) multiple beams: forming shaped beams of different shapes, the number and shape of the beams can be flexibly set, the element beams are narrow and the gain is high, which can serve multiple users at the same time, the formed beam can cover a wide area of the designated area, and it can achieve low sidelobes by means of combined feed source.

ATTACHED ICON NUMBER DESCRIPTION

Figure 1:
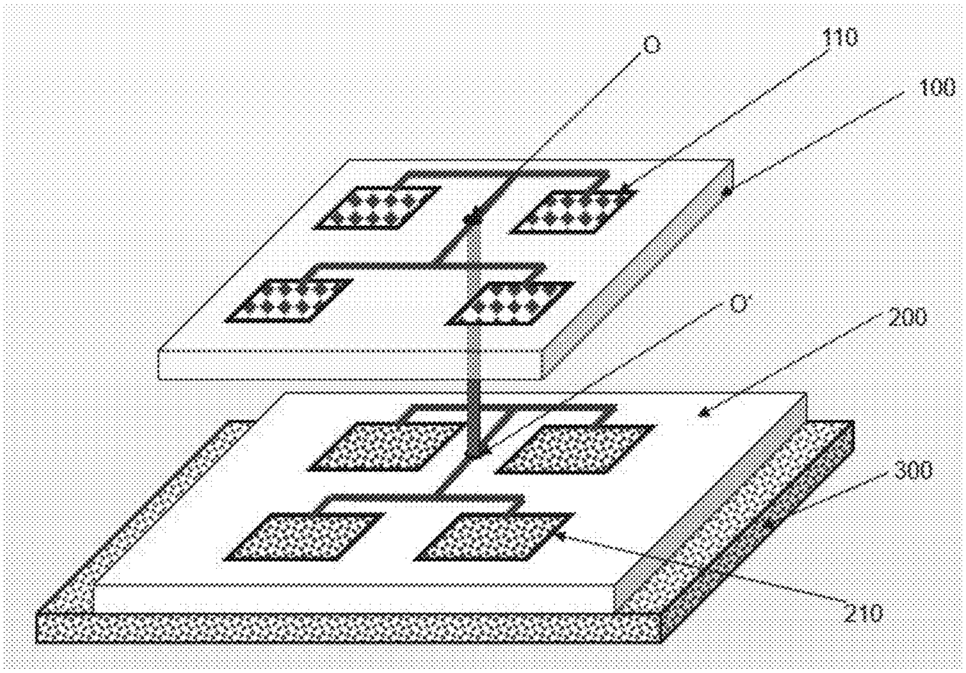
FIG. 1 is a schematic diagram of a three-dimensional structure of an array antenna apparatus in Embodiment 1 of the present invention.

100—first substrate; 110—first antenna; O is the geometric center of the first substrate;

200—second substrate; 210—second antenna; O' is the geometric center of the second substrate;

300—reflector; 400—first connection line; 500—second connecting line; 600—through hole; 700—Feeder;

111, 112, 113, 114—the array element of the first substrate;

211, 212, 213, 214—array element of the second substrate;

11A, 11B, 11C, 11D, 11E, 11F, 11G, 11H—array element of the first substrate;

21A, 21B, 21C, 21D, 21E, 21F, 21G, 21H—array element of the second substrate;

11*a*, 11*b*, 11*c*, 11*d*, 11*e*, 11*f*, 11*g*, 11*h*-array element of the first substrate;

21*a*, 21*b*, 21*c*, 21*d*, 21*e*, 21*f*, 21*g*, 21*h*—array element of the second substrate.

DETAILED DESCRIPTION OF THE PREFERRED EMBODIMENT

In order to make the objectives, technical solutions, and advantages of the embodiments of the present invention clearer, the technical solutions in the embodiments of the present invention will be described clearly and completely in conjunction with the accompanying drawings in the embodiments of the present invention. It should be noted that, in this specification, terms like "first" and "second" are only used for descriptive purposes, and cannot be understood as indicating or implying their relative importance or implicitly indicating the number of indicated technical features. In the description of the present invention, it should be understood that the orientation or positional relationship indicated by the terms of "center", "upper", "lower", "front", "rear", "left", "right", "vertical", "horizontal" "top", "bottom", "inner", "outer", etc. are based on the orientation or positional relationship shown in the drawings, which is only for the convenience of describing the application and simplifying the description, rather than indicating or implying that the device or element referred to must have a specific orientation, be configured and operated in a specific orientation, and therefore cannot be understood as a limitation of the present invention. Moreover, the terms "comprise", "include" or any other variations thereof are intended to cover non-exclusive inclusion, so that a process, method, article or device including a series of elements not only includes those elements, but also includes other elements that are not explicitly listed, or elements inherent to the process, method, article, or equipment. If there are no more restrictions, the element defined by the sentence "including . . . " does not exclude the existence of other same elements in the process, method, article or equipment that includes the element. If there is no conflict, the embodiments of the present invention and various features in the embodiments can be combined with each other, and all fall within the protection scope of the present invention.

EMBODIMENTS OF THE PRESENT INVENTION

Embodiment 1

Referring to FIG. 1, an array antenna apparatus in Embodiment 1 of the present invention is mainly used in high-speed communications and radar, which mainly includes:

at least two substrates: a first substrate 100 and a second substrate 200 which are provided from top to bottom, wherein a first antenna 110 is provided on the first substrate 100;

a second antenna 210 is provided on the second substrate 200;

the first antenna 110 is provided with a plurality of array elements arranged in an array, the second antenna 210 is provided with a plurality of array elements arranged in an array; each element here can be composed of a microstrip patch, and preferably each microstrip patch has a rectangular shape. The array arrangement here can be implemented as follows:

the matrix of the array antenna consists of at least 2*1 elements, which can be expanded to a larger scale, wherein the number of rows and columns of the matrix is an exponential multiple of 2, such as 2*2, 2*4, 4*4, 4*8, 8*8, 8*16, 16*16, 32*32 and other scales. It may also be other matrix arrangements, such as 2*3, 2*6, 2*12, etc., which also fall within the achievable scope of the present invention.

Wherein the projections of all the array elements of the first antenna 110 and all the array elements of the second antenna 210 on the second substrate 200 do not completely coincide. The incomplete coincidence here means that the size of the array element of the first antenna is different from the size of the array element of the second antenna. Or the projections of the array element of the first antenna and the array element of the second antenna on the second substrate do not coincide or partially coincide.

In addition, the size of the first substrate and the size of the second substrate are preferably the same, of course, they may be different. It should be noted that the size (size of array element, size of substrate) mentioned herein refers to the length (usually called the antenna length) on the Y-axis and the width (usually called the antenna width) on the X-axis when the device is represented by a two-dimensional plane coordinate axis without calculating the thickness of the device, the thickness of the device is the height difference between the upper surface and the lower surface of the device in the top-down direction in the present invention, namely the vertical direction.

Figure 3:
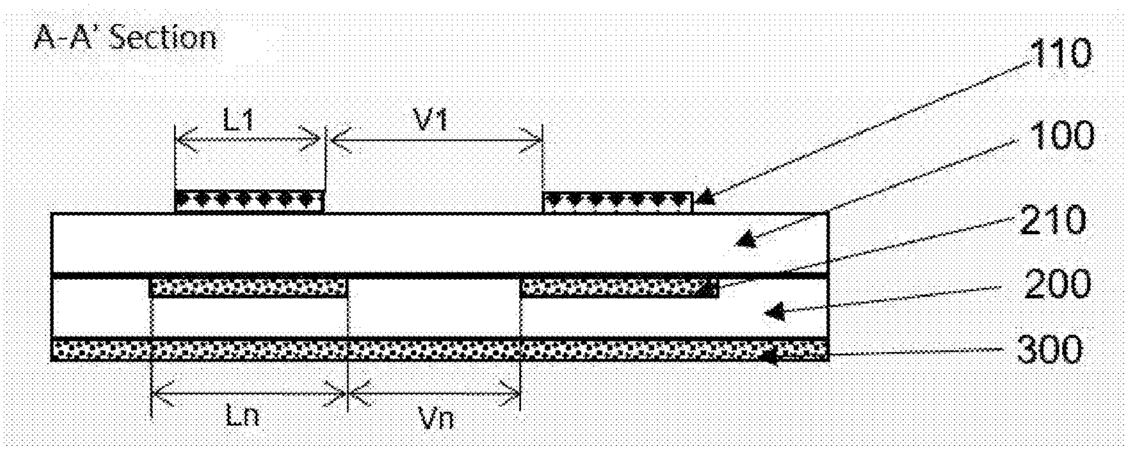
FIG. 3 is a schematic structural view of the A-A' section in FIG. 2.
Figure 4:
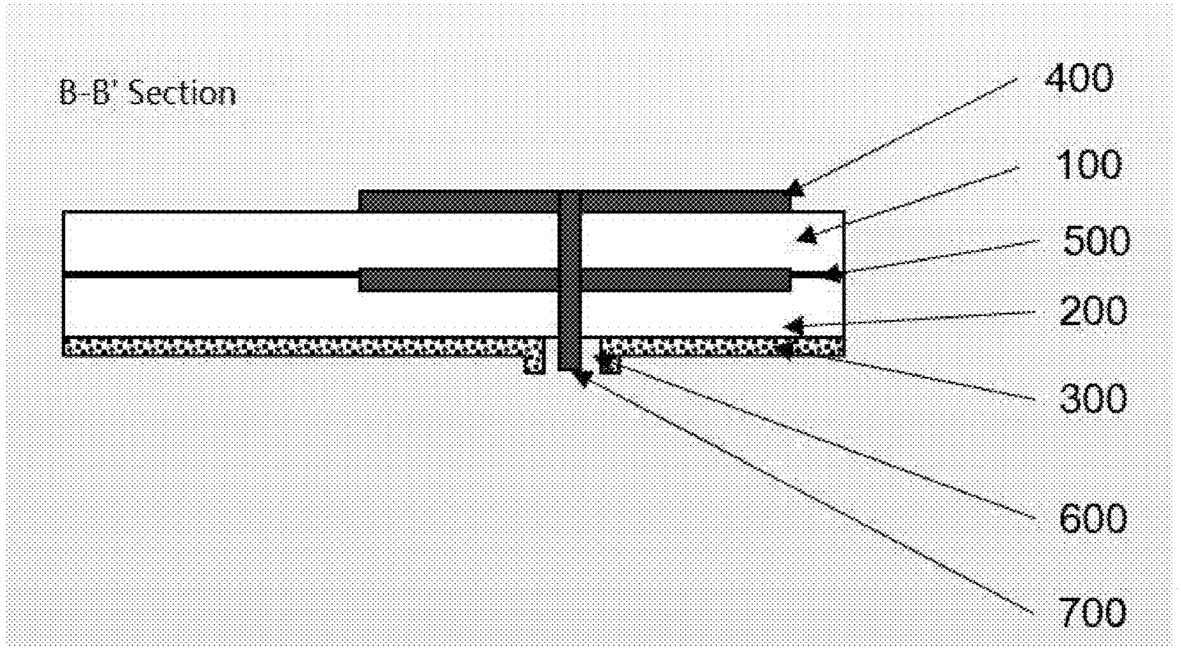
FIG. 4 is a schematic structural diagram of the B-B' section in FIG. 2.

Here, the first antenna and the second antenna may be only transmitting antennas or receiving antennas, or each may include a transmitting antenna and a receiving antenna, respectively. For example, when the first antenna or the second antenna includes a transmitting antenna and a receiving antenna at the same time, the receiving antenna and the transmitting antenna on the same substrate are connected to each other through metal wire vias. As shown in FIG. 3 and FIG. 4, the array element of the receiving antenna and the array element of the transmitting antenna of the first antenna on the first substrate are connected by a first connecting line 400, the array element of the receiving antenna and the array element of the transmitting antenna of the second antenna on the second substrate are connected by a second connecting line 500. The array element of the first antenna and the array element of the second antenna pass through a through holes 600 provided on the first substrate and the second substrate through the feeder 700 and then are connected to the chip of the array antenna apparatus (not shown in the figure), and communication is realized by transmitting the signal to the chip and then processing by the chip.

In a preferred embodiment, the array elements on the same substrate are connected by connecting lines, and the array elements are arranged symmetrically on both sides of the connecting line (as shown in FIG. 1). At the same time, the geometric center O of the first substrate 100 and the geometric center O' of the second substrate 200 are located on the connecting line, which is also the geometric center of the connecting line.

In addition, the number of substrates and the number of antennas provided on the substrate can be set to n, n is greater than or equal to 2, in this way, multiple beams can be realized, and the projections between the array elements of each layer and the array elements of other layers on the designated surface of any substrate do not completely coincide, such as staggered arrangement or partial coincidence. In this way, it is possible to realize that the main lobes of the array elements of each layer point to different directions, and the angle of each main lobe can be adjusted through the incomplete coincidence of the array elements, so as to realize a large bandwidth, and it is also possible to cancel the horizontal sidelobe levels generated by the array antennas on each substrate.

The positions of two or more layers of antenna array elements are evenly overlapped but not completely overlapped, and the sizes of the array elements (microstrip patches) are different, and multi-channel or large-bandwidth transmission can be realized in the same transmitting/receiving direction.

The length of any element of the first antenna or the second antenna is approximately equal to 0.5 times the medium wavelength λ. Usually millimeter waves are used, so the size of the antenna can be small, preferably between 0.3λ and 1.2λ.

Figure 2:
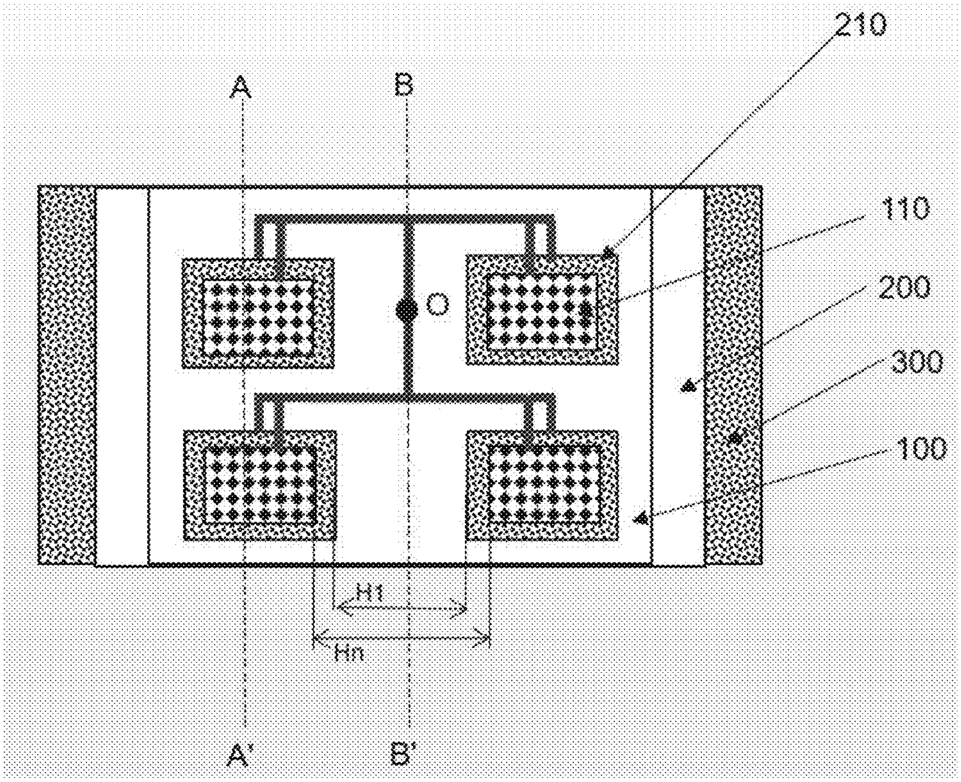
FIG. 2 is a schematic structural diagram of the array antenna apparatus in FIG. 1 drawn in perspective from a top view angle.

In FIG. 2 to FIG. 4, H is the horizontal spacing of the array element (microstrip patch), the number 1 refers to the first layer antenna, and the letter n refers to the n-th layer antenna. H1 is the horizontal spacing between the microstrip patches of the first layer antenna, and Hn is the horizontal spacing between the microstrip patches of the n-th layer antenna; it can be seen that the size of H1 in the figure is different from the size of Hn.

V is the longitudinal spacing of the array element (microstrip patch), the number 1 refers to the first layer antenna, and the letter n refers to the nth layer antenna. VI is the longitudinal spacing between the microstrip patches of the first layer antenna, and Vn is the longitudinal spacing between the microstrip patches of the nth layer antenna; the size of VI is also different from the size of Vn.

L is the width of the array element (microstrip patch), the number 1 refers to the first layer antenna, and the letter n refers to the nth layer antenna. L1 is the width of the microstrip patch of the first layer antenna, and Ln is the width of the microstrip patch of the nth layer antenna. The size of L1 is also different from the size of Ln.

After arranging according to the antenna structure disclosed in the present invention, the antenna bandwidth is increased and multi-beam is realized, and it can effectively adjust and suppress antenna side lobes, effectively reduce mutual coupling and interference between antennas, and improve communication quality and radar detection efficiency.

The array antenna apparatus according to the first embodiment of the present invention adopts an up-down design in a three-dimensional space, and the array elements of the array antenna on each substrate layer and the array elements of the array antenna on the other substrate layers are designed to be differentiated in the array element layout position and the spacing between adjacent array elements, which not only overcomes the technical prejudice in the prior art, namely the prejudice of designing upper and lower layers in three-dimensional space, but also can effectively achieve the following beneficial effects:

1) sidelobe suppression: reducing the energy distribution of the upper sidelobe to reduce the co-frequency, adjacent frequency, cross-area interference caused by the excessive upper sidelobe, achieving the optimized zero-point cancellation effect, so as to achieve a more ideal sidelobe suppression;
2) large bandwidth or multiple channels: with high information rate, wide spectrum spreading ability, reducing multipath, clutter and enhancing anti-interference ability; in the wireless communication of adjacent frequencies, it is easy to overcome mutual interference; greatly increasing the communication volume;
3) multiple beams: forming shaped beams of different shapes, the number and shape of the beams can be flexibly set, the element beams are narrow and the gain is high, which can serve multiple users at the same time, the formed beam can cover a wide area of the designated area, and it can achieve low sidelobes by means of combined feed source.

Embodiment 2

Figure 5:
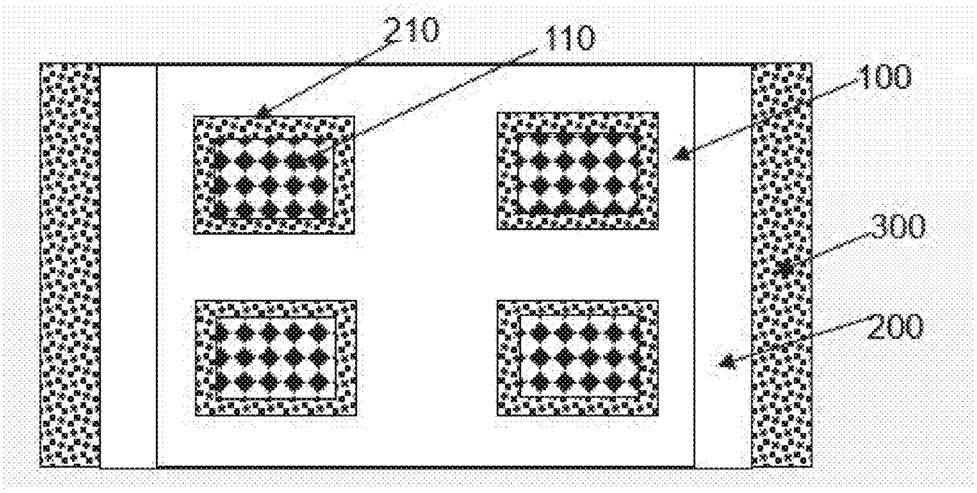
FIG. 5 is a schematic structural diagram of an array antenna apparatus in Embodiment 2 of the present invention.

Referring to FIG. 5, on the basis of Embodiment 1 of the present invention, Embodiment 2 of the present invention further improves and refines the array antenna apparatus, the main features are as follows: all the array elements of the first antenna are symmetrically distributed about the geometric center of the first substrate, and all the array elements of the second antenna are symmetrically distributed about the geometric center of the second substrate, the projections of the geometric center of the first substrate and the geometric center of the second substrate on the second substrate coincide.

In a specific embodiment, the size of each array element of the first antenna is different from the size of each array element of the second antenna.

Specifically, all the array elements of the first antenna 110 on the first substrate 100 have the same size, and the spacings between any two adjacent array elements are equal, which are arranged in a center-symmetrical arrangement. All the array elements of the second antenna 210 on the second substrate 200 have the same size, and the spacings between any two adjacent array elements are equal, and the center is symmetrically arranged. The projection of the geometric center of the first substrate and the geometric center of the second substrate on the second substrate completely coincides.

The length of each array element (microstrip patch) of the first antenna is different from the length of each array element (microstrip patch) of the second antenna, therefore each generates an outgoing wave of different frequencies to form multiple frequency bands or to be superimposed on each other in the frequency domain to achieve the effect of increasing the bandwidth.

Embodiment 3

Figure 6:
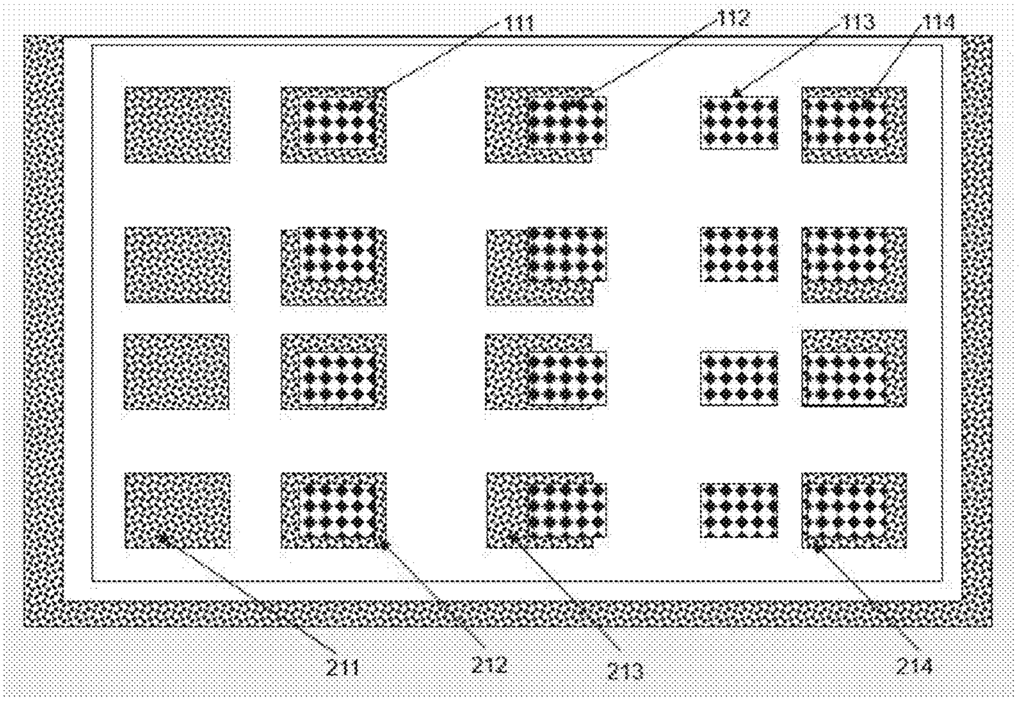
FIG. 6 is a schematic structural diagram of an array antenna apparatus in Embodiment 3 of the present invention.

Referring to FIG. 6, on the basis of Embodiment 1 of the present invention, Embodiment 3 of the present invention is further improved and refined. The main feature is that all the array elements 111, 112, 113, 114 of the first antenna are not symmetrically distributed about the geometric center of the first substrate, all the array elements 211, 212, 213, and 214 of the second antenna are not symmetrically distributed about the geometric center of the second substrate, the geometric center of the first substrate coincides with the projection of the geometric center of the second substrate on the second substrate. All the array elements 111, 112, 113, 114 of the first antenna are offset to the right by a certain distance relative to the geometric center of the first substrate, all the array elements 211, 212, 213, and 214 of the second antenna are offset to the left by a certain distance relative to the geometric center of the second substrate. Even the projections of both on the second substrate have completely non-overlapping parts.

The spacings between any two adjacent array elements, in a second direction perpendicular to a first direction which is from top to bottom, of each row of the first antenna are unequal, for example, the spacing between the array element 112 and the array element 113 is not equal to the spacing between the array element 113 and the array element 114. The spacings between any two adjacent array elements in the second direction of each row of the second antenna are unequal, for example, the spacing between the array element 211 and the array element 212 is not equal to the spacing between the array element 212 and the array element 213.

In this embodiment, the array element of the array antenna on a certain substrate layer is not evenly spaced or the array elements are arranged asymmetrically, which can change the beam angle and main beam direction of the main beam of the antenna on this layer, at the same time, under this circumstance that the positions of the array elements of the antenna of each substrate layer are unevenly or asymmetrically distributed, the projections of the elements of the array elements of the antenna of other layers on any designated layer do not completely coincide, which allows each layer to produce its own electromagnetic field phase changes, and generate multiple outgoing beams. When these multi-layer antenna arrays are superimposed, a multi-beam antenna can be realized.

Embodiment 4

Figure 7:
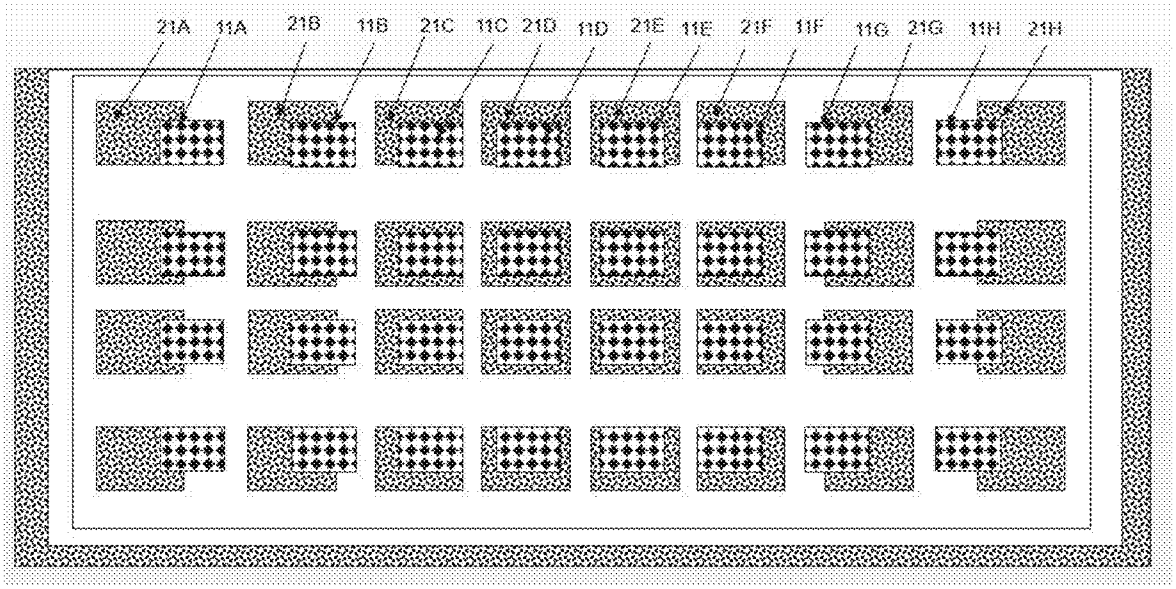
FIG. 7 is a schematic structural diagram of an array antenna apparatus in Embodiment 4 of the present invention.

Referring to FIG. 7, on the basis of Embodiment 1 of the present invention, Embodiment 4 of the present invention is further improved and refined. The main features are as follows: all the elements of the first antenna have the same size, and all the array elements of the second antenna have the same size, and the size of each array element of the first antenna is different from the size of each array element of the second antenna.

In a specific embodiment, the spacing between two adjacent array elements in the transverse and/or longitudinal direction of the first substrate among all the array elements 11A, 11B, 11C, 11D, 11E, 11F, 11G, 11H of the first antenna gradually increases as the distance from the geometric center of the first substrate increases, the spacing between two adjacent array elements in the transverse and/or longitudinal direction of the second substrate among all the array elements 21A, 21B, 21C, 21D, 21E, 21F, 21G, 21H of the second antenna gradually increases or gradually increases as the distance from the geometric center of the second substrate increases.

In a specific embodiment, the spacing between two adjacent array elements in the transverse and/or longitudinal direction of the first substrate among all the array elements of the first antenna gradually decreases as the distance from the geometric center of the first substrate increases, the spacing between two adjacent elements in the transverse and longitudinal directions of the second substrate among all elements of the second antenna gradually increases or decreases as the distance from the geometric center of the second substrate increases.

Embodiment 5

Figure 8:
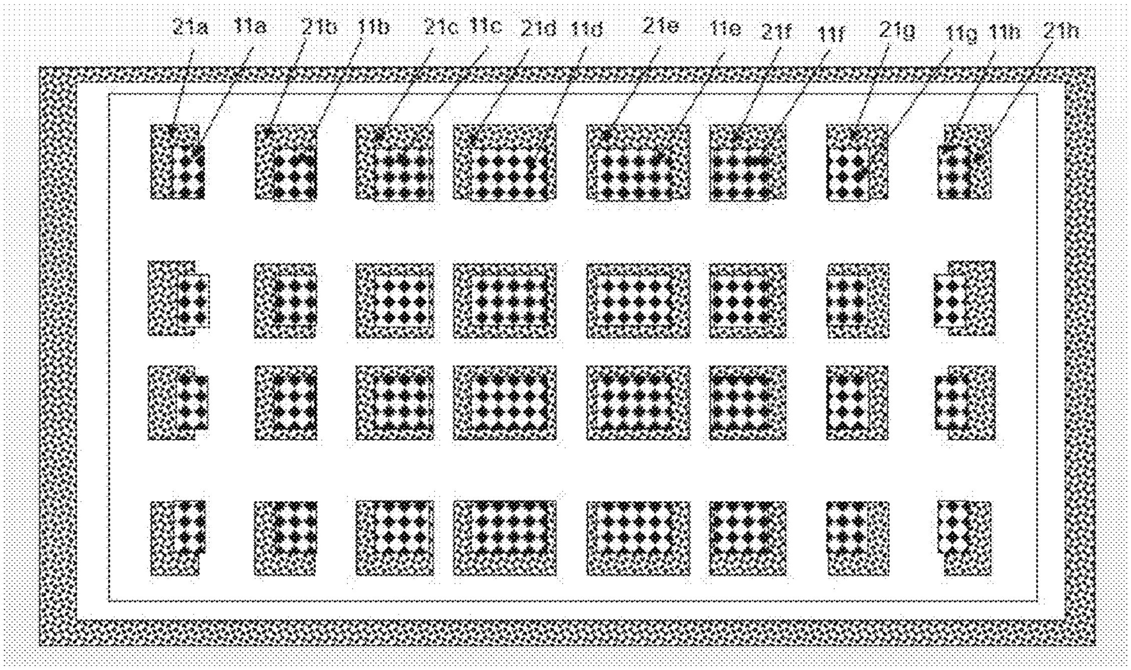
FIG. 8 is a schematic structural diagram of an array antenna apparatus in Embodiment 5 of the present invention.

Referring to FIG. 8, on the basis of Embodiment 1 of the present invention, Embodiment 5 of the present invention is further improved and refined. The main features are as follows: the sizes of all the array elements of the first antenna are the same, the sizes of all the array elements of the second antenna are the same, and the sizes of the array elements of the first antenna are different from the sizes of the array elements of the second antenna.

Further, the width of each array element 11*a*, 11*b*, 11*c*, 11*d*, 11*e*, 11*f*, 11*g*, 11*h* of the first antenna gradually increases or decreases as the distance from the geometric center of the first substrate increases, the width of each array element 21*a*, 21*b*, 21*c*, 21*d*, 21*e*, 21*f*, 21*g*, 21*h* of the second antenna gradually increases or decreases as the distance from the geometric center of the second substrate increases, and the length of each array element of the first antenna is a first preset value, and the length of each array element of the second antenna is a second preset value different from the first preset value.

In a specific embodiment, the distance between the geometric centers of any two adjacent array elements of the first antenna is a first specified value; the distance between the geometric centers of any two adjacent array elements of the second antenna is a second specified value different from the first specified value. In other words, the distance between the geometric centers of any adjacent array element of the first antenna remains unchanged, but the size of the array element is changed, and the same is true for any adjacent element of the second antenna.

Embodiment 6

Figure 9:
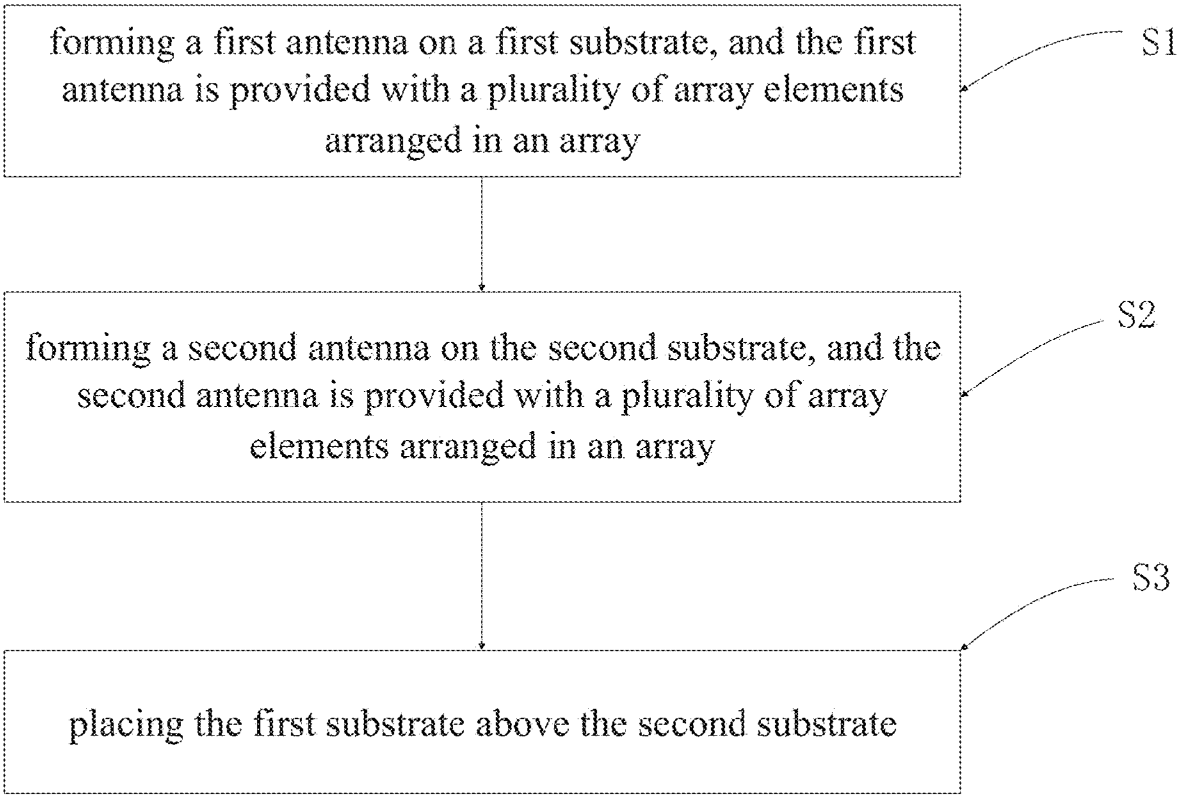
FIG. 9 is a schematic diagram of a manufacturing method of an array antenna apparatus in Embodiment 6 of the present invention.

Referring to FIG. 9, embodiment 6 of the present invention also provides a PREPARATION method of an array antenna apparatus on the basis of Embodiments 1 to 5, the preparation method includes:

S1: forming a first antenna on a first substrate, and the first antenna is provided with a plurality of array elements arranged in an array;

S2: forming a second antenna on the second substrate, and the second antenna is provided with a plurality of array elements arranged in an array; and, S3: placing the first substrate above the second substrate, wherein the projections of all the array elements of the first antenna and all the array elements of the second antenna on the second substrate do not completely coincide. For further features of the array antenna apparatus of the present invention, please refer to the description of Embodiments 1 to 5 of the present invention, which will not be repeated here.

Embodiment 7

Figure 10:
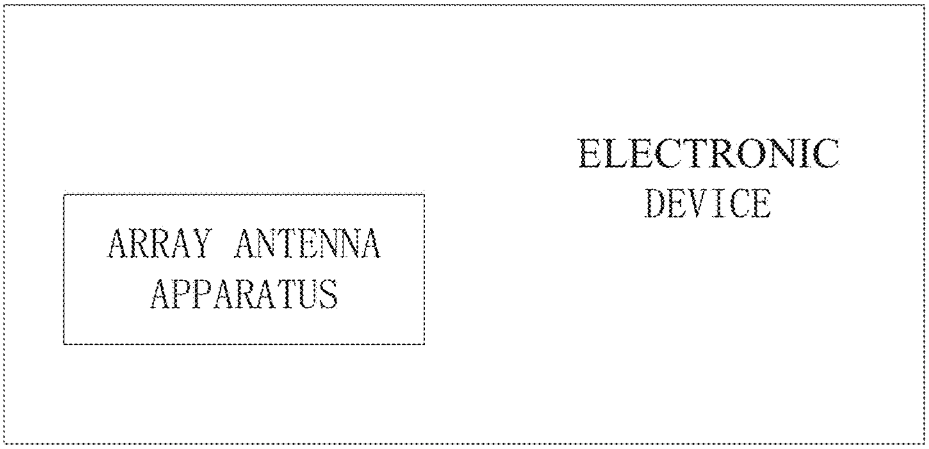
FIG. 10 is a schematic structural diagram of an electronic device using the array antenna apparatus of the foregoing embodiments 1 to 5 in Embodiment 7 of the present invention.

Referring to FIG. 10, on the basis of Embodiments 1 to 5 of the present invention, an electronic device is further provided, the electronic device includes the array antenna apparatus in the above-mentioned Embodiments 1 to 5. The electronic device can be a mobile communication device, a satellite communication device, a car, or a radar device.

It should be clear that the present invention is not limited to the specific configuration and processing described above and shown in the drawings. For the sake of brevity, a detailed description of the known method is omitted here. In the above embodiments, several specific steps are described and shown as examples. However, the method process of the present invention is not limited to the specific steps described and shown, and those skilled in the art can make various changes, modifications and additions, or change the order between the steps after understanding the spirit of the present invention. These should be covered within the protection scope of the present invention.

What is claimed is:

1. An array antenna apparatus, including:

at least two substrate: a first substrate and a second substrate which are provided from top to bottom, wherein a first antenna is provided on the first substrate;

a second antenna is provided on the second substrate;

the first antenna is provided with a plurality of array elements arranged in an array, the second antenna is provided with a plurality of array elements arranged in an array; and the projections of all the array elements of the first antenna and all the array elements of the second antenna on the second substrate do not completely coincide, all the array elements of the first antenna are symmetrically distributed about a geometric center of the first substrate, and all the array elements of the second antenna are symmetrically distributed about a geometric center of the second substrate, projections of the geometric center of the first substrate and the geometric center of the second substrate on the second substrate coincide.

2. The array antenna apparatus according to claim 1, wherein the size of each array element of the first antenna is different from the size of each array element of the second antenna.

3. The array antenna apparatus according to claim 2, wherein spacings between any two adjacent array elements, in a second direction perpendicular to a first direction which is from top to bottom, of each row of the first antenna are unequal, and spacings between any two adjacent array elements in the second direction of each row of the second antenna are unequal.

4. The array antenna apparatus according to claim 3, wherein the spacing between two adjacent array elements in the transverse and/or longitudinal direction of the first substrate among all the array elements of the first antenna gradually increases as the distance from the geometric center of the first substrate increases, the spacing between two adjacent array elements in the transverse and/or longitudinal direction of the second substrate among all the array elements of the second antenna gradually decreases as the distance from the geometric center of the first substrate decreases.

5. The array antenna apparatus according to claim 3, wherein the spacing between two adjacent array elements in the transverse and/or longitudinal direction of the first substrate among all the array elements of the first antenna gradually decreases as the distance from the geometric center of the first substrate increases, the spacing between two adjacent array elements in the transverse and longitudinal direction of the second substrate among all the array elements of the second antenna gradually increases or decreases as the distance from the geometric center of the first substrate increases.

6. The array antenna apparatus according to claim 5, wherein the distance between the geometric centers of any two adjacent array elements of the first antenna is a first specified value; the distance between the geometric centers of any two adjacent array elements of the second antenna is a second specified value different from the first specified value.

7. The array antenna apparatus according to claim 1, wherein all the array elements of the first antenna are not symmetrically distributed about the geometric center of the first substrate, all the array elements of the second antenna are not symmetrically distributed about the geometric center of the second substrate, the projections of the geometric center of the first substrate and the geometric center of the second substrate on the second substrate coincide.

8. The array antenna apparatus according to claim 1, wherein the sizes of all the array elements of the first antenna are the same, the sizes of all the array elements of the second antenna are the same, and the sizes of the array elements of the first antenna are different from the sizes of the array elements of the second antenna.

9. The array antenna apparatus according to claim 1, wherein the width of each array element of the first antenna gradually increases or decreases as the distance from the geometric center of the first substrate increases, the width of each element of the second antenna gradually increases or decreases as the distance from the geometric center of the second substrate increases, and the length of each element of the first antenna is a first preset value, and the length of each element of the second antenna is a second preset value different from the first preset value.

10. A preparation method of an array antenna apparatus, comprising:

forming a first antenna on a first substrate, and the first antenna is provided with a plurality of array elements arranged in an array;

forming a second antenna on the second substrate, and the second antenna is provided with a plurality of array elements arranged in an array; and, placing the first substrate above the second substrate, wherein, the projections of all the array elements of the first antenna and all the array elements of the second antenna on the second substrate do not completely coincide to generate an outgoing wave with different frequencies to form multiple frequency bands or to be superimpose each other in the frequency domain; the first antenna and the second antenna are one or both of a transmitting antenna and a receiving antenna, all the array elements of the first antenna are symmetrically distributed about a geometric center of the first substrate, and all the array elements of the second antenna are symmetrically distributed about a geometric center of the second substrate, projections of the geometric center of the first substrate and the geometric center of the second substrate on the second substrate coincide to generate an outgoing wave with different frequencies to form multiple frequency bands or to be superimpose each other in the frequency domain.

11. The preparation method of an array antenna apparatus according to claim 10, wherein all the array elements of the first antenna are not symmetrically distributed about the geometric center of the first substrate, all the array elements of the second antenna are not symmetrically distributed about the geometric center of the second substrate, the projections of the geometric center of the first substrate and the geometric center of the second substrate on the second substrate coincide.

12. An electronic device, wherein the electronic device includes an array antenna apparatus, including:

at least two substrate: a first substrate and a second substrate which are provided from top to bottom, wherein a first antenna is provided on the first substrate;

a second antenna is provided on the second substrate;

the first antenna is provided with a plurality of array elements arranged in an array the second antenna is provided with a plurality of array elements arranged in an array; and the projections of all the array elements of the first antenna and all the array elements of the second antenna on the second substrate do not completely coincide, all the array elements of the first antenna are symmetrically distributed about a geometric center of the first substrate, and all the array elements of the second antenna are symmetrically distributed about a geometric center of the second substrate, projections of the geometric center of the first substrate and the geometric center of the second substrate on the second substrate coincide.

13. The electronic device according to claim 12, wherein the electronic device is at least one of a mobile communication device, a radar device, a satellite communication device, or an automobile.

* * * * *